(12) United States Patent
Draggie et al.

(10) Patent No.: US 7,349,083 B2
(45) Date of Patent: Mar. 25, 2008

(54) ROTARY BORESCOPIC OPTICAL DIMENSIONAL MAPPING TOOL

(75) Inventors: Raymond Q. Draggie, Spokane, WA (US); Scott D. Maxwell, Renton, WA (US); William R. Whisler, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 831 days.

(21) Appl. No.: 10/895,608

(22) Filed: Jul. 21, 2004

(65) Prior Publication Data

US 2006/0033908 A1    Feb. 16, 2006

(51) Int. Cl.
*G01N 21/00*    (2006.01)
(52) U.S. Cl. .................... 356/241.1; 356/241.4
(58) Field of Classification Search .. 356/241.1–241.6, 356/614–622
See application file for complete search history.

(56) References Cited

U.S. PATENT DOCUMENTS

| | | |
|---|---|---|
| 3,641,849 A | 2/1972 | Kinney |
| 3,917,432 A | 11/1975 | Feuerstein et al. |
| 4,011,017 A | 3/1977 | Feuerstein et al. |
| 4,033,206 A | 7/1977 | Morita et al. |
| 4,078,864 A | 3/1978 | Howell |
| 4,207,594 A | 6/1980 | Morris et al. |
| 4,292,961 A | 10/1981 | Kawashima |
| 4,549,207 A | 10/1985 | Boshier |
| 4,659,195 A | 4/1987 | D'Amelio et al. |
| 4,702,229 A | 10/1987 | Zobel |
| 4,742,815 A | 5/1988 | Ninan et al. |
| 4,820,043 A | 4/1989 | Diener |
| 4,837,615 A | 6/1989 | Boshier |
| 4,895,431 A | 1/1990 | Tsujiuchi et al. |
| 4,935,810 A | 6/1990 | Nonami et al. |
| 5,047,848 A | 9/1991 | Krauter |

(Continued)

FOREIGN PATENT DOCUMENTS

EP    0 423 753 B2    12/1999

(Continued)

OTHER PUBLICATIONS

Peter G. Lorenz; *Video Borescope, The American Society For Nondestructive Testing*, 11 pages, available at <http://www.asnt.org/publications/materialeval/basics/sep03basics/sep03basics.htm>; downloaded Dec. 22, 2003.

(Continued)

*Primary Examiner*—Hoa Q. Pham
(74) *Attorney, Agent, or Firm*—Alston & Bird LLP

(57) ABSTRACT

A borescopic device and an associated method are provided that permit the controlled movement of the object under test both angularly and along several different axes, such that the object including its internal surfaces, can be thoroughly inspected in a controlled fashion. The borescopic device includes an adjustable holder assembly for holding an object, a borescopic imaging system including one or more probes for capturing an image of at least one surface of the object, and a monitoring system for determining the position of an image captured by the borescopic imaging system relative to the object. The adjustable holder assembly also includes one or more position indicators for providing the monitoring system with indications of the position of the object, both angularly and in at least two linear directions.

27 Claims, 3 Drawing Sheets

U.S. PATENT DOCUMENTS

| | | | |
|---|---|---|---|
| 5,392,122 A * | 2/1995 | Ulanov et al. | 356/626 |
| 5,572,999 A | 11/1996 | Funda et al. | |
| 5,573,492 A | 11/1996 | Dianna et al. | |
| 5,774,212 A | 6/1998 | Corby, Jr. | |
| 5,831,734 A * | 11/1998 | Van Tooren et al. | 356/620 |
| 5,850,469 A | 12/1998 | Martin et al. | |
| 6,009,189 A | 12/1999 | Schaack | |
| 6,333,812 B1 | 12/2001 | Rose et al. | |
| 7,022,065 B2 * | 4/2006 | Leiner et al. | 600/101 |
| 2001/0027272 A1 | 10/2001 | Saito et al. | |
| 2002/0172498 A1 | 11/2002 | Esenyan et al. | |

FOREIGN PATENT DOCUMENTS

| | | |
|---|---|---|
| WO | WO 93/00766 | 1/1993 |
| WO | WO 98/07001 | 2/1998 |

OTHER PUBLICATIONS

*U.S. Army Combat Systems Test Activity (Aberdeen Test Center), Video Borescoping, Best Manufacturing Practives*, 2 pages, available at <http://www.bmpcoe.org/bestpractices/internal/atcen/atcen_12.html> downloaded Dec. 22, 2003.

*Video Borescoping, ITT Industries, Pure-Flo Solutions Group*, 2 pages, available at <http://www.ittpureflo.com/processmodules/modulesterting.htm>; downloaded Dec. 22, 2003.

*Accessories, GMP System*; 2 pages, available at <http://www.gmpsystems.com/sanitary/accessories.htm>; downloaded Dec. 22, 2003.

*Fabrication, The Stanley-Carter Co.*; 2 pages, available at< http://www.stanley-carter.com/services/fabrication.html>; downloaded Dec. 22, 2003.

*Olympus Introduces New Encore™ High-Speed, Digital Video Camera For Motion Analysis; Olympus America, Inc.*; 2 pages, available at <http://www.olympusamerica.com/msg_section/msg_HeadlinesDetails.asp?pressNo=5>; downloaded Jan. 21, 2004.

*Video Inspection, Gradient Lens Corporation*, 2 pages, available at <http://www.gradientlens.com/access-video.asp>; downloaded Jan. 26, 2004.

*Automated XYZ Gantry Translation Stage; Applied Scientific Instrumentation*; 3 pages, available at <http://www.asiimaging.com/gts.html>; downloaded Jan. 26, 2004.

*MX-2000-XYZ Microscope Translation Stage; Applied Scientific Instrumentation*; 2 pages, available at <http://www.asiimaging.com/mx-2000-xyz.html>; downloaded Jan. 26, 2004.

*Frequently Asked Questions On Positioning; Edmund Industrial Optics*; 4 pages, available at <http://www.edmundoptics.com/techsupport/DisplayArticle.cfm?articleid=281>; downloaded Jan. 26, 2004.

*Linear Translator Selection Guide; Thorlabs, Inc.*; 4 pages, available at <http://www.thorlabs.com/SelectGuide2.cfm?Guide=6&Section=1&Ref=15&GoogleAdwords=1&Keyword=translation;> downloaded Jan. 26, 2004.

*Video Documentation; Gradient Lens Corporation*; 11 pages, available at <http://www.gradientlens.com/access-video_doc.asp>; downloaded Jan. 27, 2004.

*20 Years of RVI And NDT; Aviation Today Newsstand;,Aviation Maintenance*; 3 pages, available at <http://www.aviationtoday.com/cgi/am/show_mag.cgi?pub =am&mon=1002&file=1002ndt.htm>; downloaded Jan. 27, 2004.

*Video Documentation<; Grandient Lens Corporation*; 2 pages; available at <http://www.hawkeyeblue.com/catalog/item/476959/157227.htm>; downloaded Jan. 27, 2004.

*Tools: A Bushel Of Borescopes; Aviation Today Newsstand, Aviation Maintenance*; 7 pages, available at <http://www.aviationtoday.com/cgi/am/show . . . m&mon=0803tools_boroscopes.htm>; downloaded Jan. 27, 2004.

*Linear Long-Travel Translation Stage 17 LNR 001; Melles Griot Inc.*, 2 pages, copyright 2002.

*Vision Gauge, VOCAL Deluxe Edition; Gradient Lens Corporation*, 1 page, undated.

\* cited by examiner

ROTARY BORESCOPIC OPTICAL DIMENSIONAL MAPPING TOOL

FIELD OF THE INVENTION

The present invention relates to a device for examining a surface condition of an object. Specifically, the present invention is directed to a borescopic device and an associated method that is capable of accurately positioning an object and a probe both angularly and in multiple linear directions so as to capture images of the object that may be relevant in the examination of the object.

BACKGROUND OF THE INVENTION

Devices for observation and examination of mechanical parts are used in many industries. In particular, in industries where quality control and safety are particularly relevant and important, borescopes and other such devices are often used to examine the portions of a part or other object that are difficult to examine and evaluate with non-specialized equipment. For example, parts like cylinders, housing tubes and fluid transport lines, wear over time and it is often difficult to view the internal surface condition of these parts without the use of a borescopic device. By utilizing a borescopic device, however, the internal surfaces of these and other parts may be examined, such as on a periodic basis, to monitor the wear such that the parts may be replaced or refurbished prior to failure. It is also sometimes desirable to examine these parts after some landmark event has occurred, for example, like a catastrophic failure, in order to determine the cause of the failure or other information regarding the failure that may be used to avert future failures of similar parts.

While borescopic devices do provide a great benefit by enabling the examination of internal surfaces of parts that are otherwise difficult to inspect, there are limitations. Specifically, it is often difficult to record or document, with great accuracy, a position of a particular portion of the object being examined. In this regard, borescopic devices provide images of the object, but it may prove difficult to determine with any significant degree of accuracy the particular location upon the object that has been captured in an image. Although difficult to do, it is sometimes desirable to identify the precise location upon the object that has been captured, such as to determine the cause of a failure in a forensic analysis or to permit re-examination of the same location at some later time. Further, the freedom of movement of the parts being examined and the borescopic devices used to examine the parts is often limited, making the examination process more cumbersome and less efficient than desired.

Accordingly, there exists a need for a borescopic device and method capable of examining parts, including the internal surfaces of parts, in a manner that is efficient, accurate and repeatable. In this regard, it would be desirable to provide a borescopic device and method that are capable of permitting controlled movement of the object under test both angularly and along several different axes. Additionally, it would be desirable to provide a borescopic device and method that could precisely identify the location of the part that is captured in an image to permit the inspection to be easily repeated and/or to provide more detailed information during a forensic analysis.

SUMMARY OF THE INVENTION

A borescopic device and associated method are therefore provided that address the foregoing and other needs. In this regard, the borescopic device and method of embodiments of the present invention provide for the controlled movement of the object under test both angularly and along several different axes, such that the object including its internal surfaces, can be thoroughly inspected in a controlled fashion. In addition, the borescopic device and method of embodiments of the present invention permit those portions of an object that are depicted in an image to be precisely located, thereby facilitating comparisons with inspections of the same object conducted at other times and/or providing more detailed information during a forensic analysis of the object. Further, the borescopic device and method of embodiments of the present invention permit the concurrent examination of opposed surfaces of the object, such as interior and exterior surfaces, by means of first and second probes that are maintained in alignment with one another.

In one aspect, the borescopic device comprises an adjustable holder assembly for holding an object, a borescopic imaging system for capturing an image of at least one surface of the object, and a monitoring system for determining the position of an image captured by the borescopic imaging system relative to the object. In this regard, the adjustable holder assembly includes a first positional adjuster for providing linear movement of the object in a first direction, a second positional adjuster for providing linear movement of the object in a second direction different from the first direction, such as by being perpendicular to the first direction, and an angular adjuster for providing angular movement of the object. In some embodiments, the adjustable holder assembly can also include a third positional adjuster for providing linear movement in a third direction, different than both the first and second directions, such as by being perpendicular to both the first and second directions. The adjustable holder assembly also includes a position indicator for providing an indication of the position of the object in each of the first and second directions as well as the angular position of the object. In various embodiments, the position indicator may include a camera for capturing a visible representation of the position of the object and/or a transducer for providing a signal representative of the position of the object.

The borescopic imaging system includes a probe moveable in the first direction and capable of capturing an image of at least one surface of the object. In some embodiments, the borescopic imaging system may include an additional positional adjuster for providing linear movement of the probe in a third direction, different than the first and second directions. The borescopic imaging system can also include a position indicator for providing an indication of the position of the probe. Like the adjustable holder assembly, the position indicator may include a camera for capturing a visible representation of the position of the probe and/or a transducer for providing a signal representative of the position of the probe.

In addition, the monitoring system determines the position of an image captured by the borescopic imaging system relative to the object based upon the indications provided by the position indicators of the adjustable holder assembly and the borescopic imaging system. By locating the images with respect to the object under test, a technician can analyze the object with more precision than conventional techniques. Additionally, the location of the images with respect to the object facilitates the repeatability of the testing procedure so that changes over time, such as increased wear, can be monitored. To further assist a technician in an analysis of an object, the borescopic device may include a display for displaying the image captured by the borescopic imaging system and, in one embodiment, for concurrently displaying the indication of the position of the probe and/or the object.

In one advantageous aspect, the borescopic imaging system includes first and second probes, both generally moveable in at least the first direction. The first and second probes may capture respective images of the opposite surfaces of the object, such the interior and exterior surfaces of an object. The borescopic imaging system maintains the first and second probes in alignment with one another. For example, one probe may carry an optical source and the other probe may carry an optical detector for facilitating alignment of the probes. Additionally, each probe may include a projected pointer source, e.g., laser pointer, for creating respective points in the images of the opposite surfaces of the object. As such, the resulting images captured by the first and second probes can therefore be registered with one another based upon the reference points. Thus, the borescopic device and method of this embodiment permits the concurrent examination of opposed surfaces of an object in a controlled and repeatable fashion, thereby further enhancing the inspection capabilities afforded by embodiments of the present invention.

BRIEF DESCRIPTION OF THE DRAWINGS

Reference will now be made to the accompanying drawings, which are not necessarily drawn to scale, and wherein.

DETAILED DESCRIPTION

Figure 1:
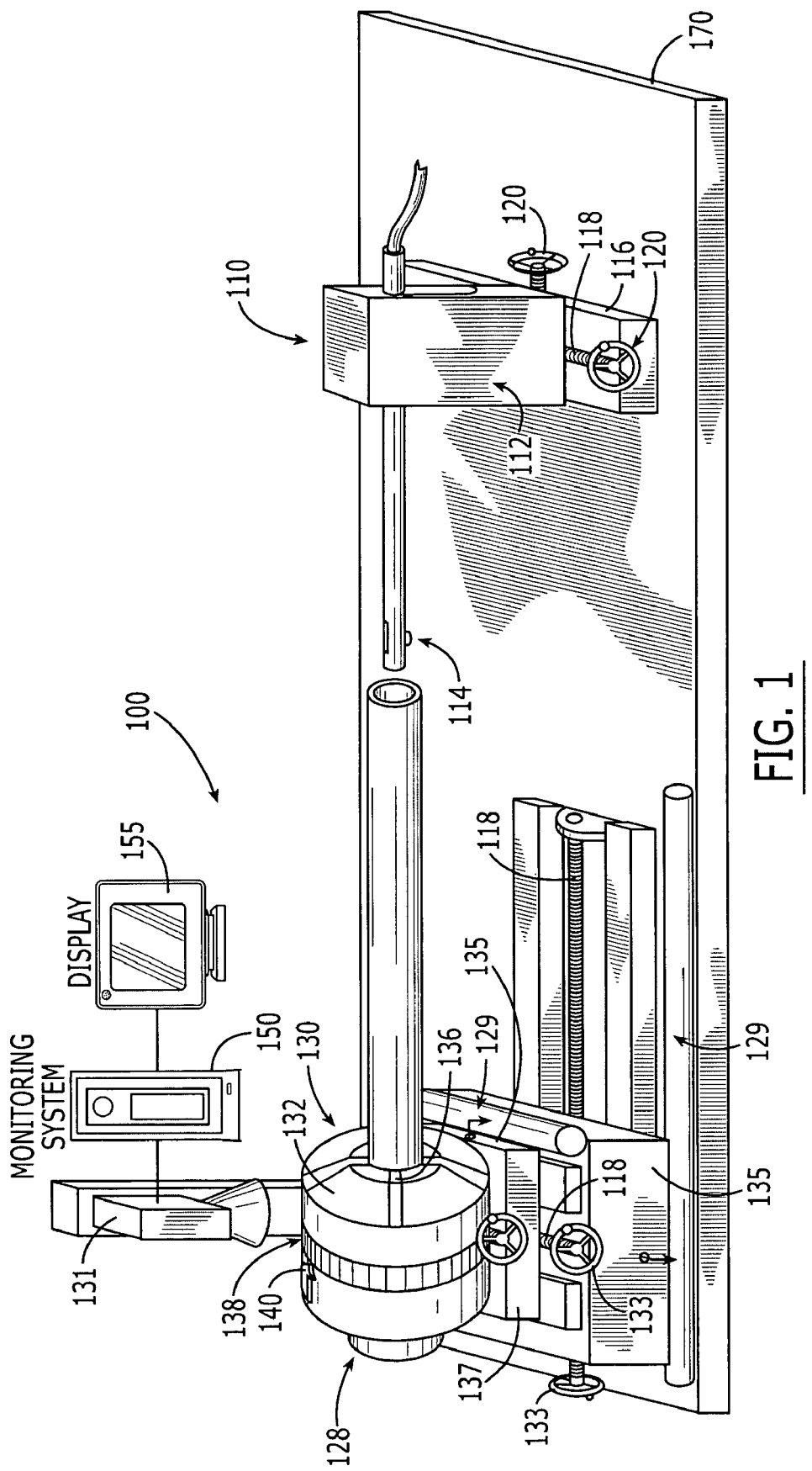
FIG. 1 is a perspective view of a borescopic device in accordance with one embodiment of the present invention.

In the drawings and the following detailed description, different embodiments are described in detail to enable practice of the invention. Although the invention is described with reference to these specific embodiments, it will be understood that the invention is not limited to these embodiments. But to the contrary, the invention includes numerous alternatives, modifications and equivalents as will become apparent from consideration of the following detailed description and accompanying drawings. In the drawings, like numbers refer to like elements throughout. The present invention will now be further described by the following non-limiting examples.

FIG. 1 illustrates one embodiment of the present invention. Borescopic device 100 of the embodiment depicted in FIG. 1 includes a borescopic imaging system 110, an adjustable holder assembly 130, and a monitoring system 150. As seen in FIG. 1, borescopic imaging system 110 and adjustable holder assembly 130 are both positioned on a supporting platform 170 to provide a common frame of reference and are spaced apart from each other. However, such a configuration is merely exemplary, and in fact, the components of borescopic device 100 can be positioned and configured in orther manners relative to each other so long as the borescopic imaging system 110 and the adjustable holder assembly 130 maintain a positional relationship with one another that is known and generally repeatable. Each of the components of borescopic device 100 will now be described in greater detail.

The borescopic imaging system 110 includes at least one probe 114 that includes a surface imaging system, for example, a borescope, a videoscope, or a fiberscope, to allow for viewing of an object. Although not necessary for the practice of the invention, the surface imaging system is generally disposed at the distal end of probe 114. The borescopic imaging system also generally includes at least one position adjuster for controllably positioning the probe. Although the position adjuster may be configured in a variety of manners, the borescopic imaging system 110 of the illustrated embodiment includes an adjustable tower 112 or other fixture which securely holds the probe 114 and from which the probe extends. The tower 112 and, in turn, the probe 114 is adapted to be adjustably positioned in a first direction, such as the y-direction as shown in FIG. 1, by means of the position adjuster. Various types of position adjusters may be utilized including, for example, a threaded shaft 118 that carries or is otherwise mechanically coupled to the tower 112 such that rotation of the threaded shaft, such as by means of a manually operated actuating wheel 120, causes controlled movement of the tower 112 and, in turn, the probe 114 in the respective direction. As should be apparent, however, the position adjuster may be differently configured and may, include, for example, the use of an electric motor, or a pneumatic or hydraulic servo system. Additionally, while the borescopic device 110 of the illustrated embodiment provides for manual positioning of the probe 114, the position adjuster may be responsive to control signals provided by a controller based on preprogrammed instructions, or instructions input at the time of an inspection. The tower 112 may also be adapted to be adjustably positioned in other directions, such as the z-direction as shown in FIG. 1, by means of the same type of position adjuster, such as a threaded shaft actuated by an actuating wheel 120, or a different type of position adjuster. In instances in which the borescopic imaging system 110 permits controlled movement of the probe in two or more directions, the position adjusters are generally configured to provide linear movement along perpendicular axes. As such, the borescopic imaging system 110 permits the probe to be positioned in at least one direction relative to the object under test.

In the illustrated embodiment, the tower 112 is shown to be movably mounted upon a borescopic base 116 that, in turn, is fixedly secured to the supporting platform 170. However, in other embodiments, the tower 112 and borescopic base 116 may form a single unit such that tower 112 remains stationary on borescopic base 116, and the entire borescopic imaging system 110 moves relative to the supporting platform 170. Still further, the tower 112 may be mounted directly to the supporting platform 170 and adapted to controllably move relative to the supporting platform by means of one or more position adjusters.

Another component of borescopic device 100, the adjustable holder assembly 130, is designed to hold the object under test. The borescopic device 100 and method may be configured to examine a wide variety of objects, although the borescopic device 100 and method are particularly useful for examining objects having interior surfaces that are best accessed by means of a probe 114. To list a few examples, the object may be a hydraulic or pneumatic cylinder, a pressure vessel, an actuator, a reservoir, a tube, a pipe, a duct, a fitting, a connector or a shock absorber.

While the adjustable holder assembly 130 may be configured in different manners, the adjustable holder assembly 130 of the illustrated embodiment includes an upper holder 132 and a holder base 134. The upper holder 132 is positioned on the holder base 134, and the holder base 134 is, in turn, positioned on the supporting platform 170 such that the object may be moved both angularly and in at least two linear directions.

In accordance with the presently described embodiment, upper holder 132 includes a clamping device 136 for securely engaging the object. In one embodiment, clamping device 136 is a chuck and an object is secured to the chuck by adjusting the holding jaws of the chuck to accommodate the size of the particular object being examined, then tightening the chuck to hold the object in place. Although any type of chuck can be used as clamping device 136, there is no requirement that a chuck be used. Specifically, chucks and other suitable alternatives are known to those of ordinary skill in the art, and accordingly, any other suitable clamping device 136 can be used without departing from the presently disclosed invention. Moreover, while the object is described to be held directly by the chuck, the object may, instead, be engaged by an adapter plate and the adapter plate may, in turn, be engaged by the chuck or other clamping device 136. Still further, the upper holder 132 may optionally include a roller support underlying the object and supporting the object while the object is engaged by the clamping device 136.

According to the illustrated embodiment, upper holder 132 of adjustable holder assembly 130 is angularly or rotatably moveable about an axis of rotation. For cylindrical objects, the object may be mounted such that the axis of rotation coincides with the longitudinal axis defined by the cylindrical object. However, the object may be mounted in a different orientation, if so desired. According to the exemplary embodiment, upper holder 132 can include means for holding and rotating the object, such as a rotary table that is mounted on the holder base 134 and that carries the clamping device 136 such that clamping device 136 and, in turn, the object is controllably rotatable, either manually by the technician, such as in response to actuation of the adjustment wheel 137 shown in the embodiment of FIG. 1, or in an automated fashion in response to control signals. The use of a rotary table is merely exemplary, however, since the upper holder 132 can include other mechanisms for rotating the clamping device 136.

In the illustrated embodiment, the holder base 134 is adapted for movement in at least two linear directions so as to controllably position the object in those same directions. Although the holder base 134 may be configured in various manners, the holder base 134 of the illustrated embodiment includes a pair of translation stages 135, each controllably positioned by a respective position adjuster so as to move along tracks in a respective direction. As described above in conjunction with the borescopic imaging system 110, the adjustable holder assembly 130 may include various types of position adjusters, including a threaded shaft 118 that engages the respective translation stage 135 and moves the translation stage in the respective direction upon rotation of the threaded shaft. In the illustrated embodiment, for example, a lower translation stage is adapted to move in the x-direction, while an upper translation stage is adapted to move in the y-direction. In other embodiments, at least a portion of holder assembly 130 is moveable in a third linear direction, such as the z-direction perpendicular to the first and second directions. Again, the position adjusters of the adjustable holder assembly 130 may be responsive to manual input, such as rotation of a respective actuating wheel 133, or to control signals provided via a controller or the like in response to preprogrammed instructions or instructions provided at the time of inspecting an object.

Additionally, whereas the present embodiment was described such that upper holder 132 is coupled to holder base 134, and both upper holder 132 and base holder 134 move in the first and second linear directions, several other configurations are possible without departing from the presently disclosed invention. For example, an alternative embodiment may include a holder assembly 130 wherein an upper holder 132 is moveable in the first and second linear directions relative to a stationary holder base 134. Further, there is no requirement that upper holder 132 and holder base 134 be separately constructed pieces combined to form holder assembly 130. Instead, holder assembly 130 can be one wholly constructed unit.

In addition to the above described features of borescopic device 100, the presently described embodiment includes position indicators for providing indications of a position of the adjustable holder assembly 130 and, in turn, the object under inspection. According to the present invention, the position indicators can provide a visible representation of the position of the object, a signal, such as an electrical signal, representative of the position of the object, or both a visible representation and a signal defining the position of the object. In the illustrated embodiment, the adjustable holder assembly 130 may include a position indicator associated with upper holder 132 of holder assembly 130 to provide a visible representation of the angular position of the object. For example, this position indicator may include a rotation angle scale 138 defining a predefined range of angles through which the clamping device may be rotated and an angular movement pointer 140. In operation, rotation angle scale 138 remains fixed in position while the angular movement pointer 140 moves with the clamping device. Accordingly, as the clamping device 136 rotates, so too does angular movement pointer 140, and as such, angular movement pointer 140 will point to a corresponding angular position on rotation angle scale 138. Thus, the combination of rotation angle scale 138 and angular movement pointer 140 provides a means for indicating the angular position of the object. This position indicator may therefore also include a camera 131 for capturing an image of the angular movement pointer 140 relative to the rotation angle scale such that the image captured by the camera serves as a visible representation of the position of the object.

The other position indicators may operate in much the same way, albeit in a manner to provide an indication of the object in a respective linear direction. Specifically, a position indicator may be associated with each translation stage and may include a linear position scale 122 that is fixed in position relative to the supporting platform 170 and that extends in the same direction in which the respective translation stage is adapted to move and a linear movement pointer 124 which moves with the respective translation stage and, therefore, with the object. Accordingly, any movement of object 112 in the results in a corresponding movement of linear movement pointer 124 along linear position scale 122 to indicate a position of the object in the respective direction. As such, these position indicators may also include cameras 126 for capturing an image of the linear movement pointer 124 relative to the linear position scale such that the image captured by the camera 126 serves as a visible representation of the position of the object.

Although, the embodiment described herein describes position indicators having a fixed scale in combination with a moveable pointer, the reverse is also possible. In particular, it is also possible to affix the pointer such that it remains stationary, and place the scale on a moveable component. In such an embodiment, as the object is moved, the scale slides across the pointer to indicate a position.

In addition to, or instead of, the position indicators that capture a visible representation of the position of the object as described above, the borescopic device 100 may include position indicators that provide signals, such as electrical signals, indicative of the position of the object, both angularly and in each of the linear directions in which the object may be positioned. For example, the position indicators may include a rotation angle transducer 128, such as a Rotational Variable Differential Transformer (RVDT) for providing a signal indicative of the angular position of the object, and linear displacement transducers 129 associated with the respective translation stages 135 for providing signals indicative of the position of the object in along each of the linear directions in which the object may be positioned. Still further, the borescopic device 100 may utilize other types of transducers 129 for providing signals indicative of the position of the object including, for example, encoders, potentiometers, Linear Variable Differential Transformers (LVDTs), Direct Current Differential Transformers (DCDTs), laser positioning systems or the like.

While the adjustable holder assembly 130 is described above to have various types of position indicators, the borescopic imaging system 110 may similarly have position indicators for providing an indication of the position of the probe 114. In each dimension in which the probe is movable, for example, the borescopic imaging system may have position indicator(s), such as a camera for capturing an image of an associated scale and pointer, for providing a visible representation of the position of the probe and/or position indicators, such as a transducer or the like, for providing a signal indicative of the position of the probe.

As shown in FIG. 1, in addition to the components described above, borescopic device 100 includes a monitoring system 150. Monitoring system 150 may include a controller or other computing device operating under software control for determining the position of the image captured by the borescopic imaging system 110 relative to the object. In this regard, the monitoring system 150 is responsive to the various position indicators so as to determine the position of the image based on the indications provided by the position indicators. Thus, the monitoring system 150 can determine with precision which portion of the object is depicted in the image. The monitoring system 150 may include or be communicably connected with a display 155 for displaying the image(s) captured by the borescopic imaging system. In one advantageous embodiment, the display 155 may also depict the indication of the position of at least one of the probe 114 and the object concurrent with the image captured by the borescopic imaging system 110. For example, the display 155 may be driven to have a split screen which concurrently depicts the image captured by the borescopic imaging system, a numerical representation of the position of the probe 114 relative to the object at the time that the image was captured as provided by the various transducers 129 and/or a visual representation of the position of the probe relative to the object at the time that the image was captured as provided by the cameras 126,131 that are trained on the various scales and pointers. The technician can therefore monitor the displayed images to detect flaw, faults or other areas of interest during the inspection process. The technician can provide an input to the monitoring device 150 to flag one or more locations of interest upon the object for further review, either at the present time or at some later time. In addition, or alternatively, the monitoring system 150 may be configured to automatically flag areas of interest for more detailed review by the technician, such as by comparing the images captured by the borescopic imaging system 110 to a predefined set of images and/or by relating the images and the associated positional information to the electronic representation of the CAD drawings for the object. The monitoring system 150 also generally stores the images captured by the borescopic imaging system 110 along with the associated positional information. In instances in which the object is also represented by a CAD drawing, the monitoring system can also provide for the importation of information gathered during or following the inspection process, such as the flags or alerts, to the electronic data file containing a representation of the CAD drawing. In this regard, the monitoring system can associated this information with a specific portion of the object in the CAD drawing.

Figure 2:
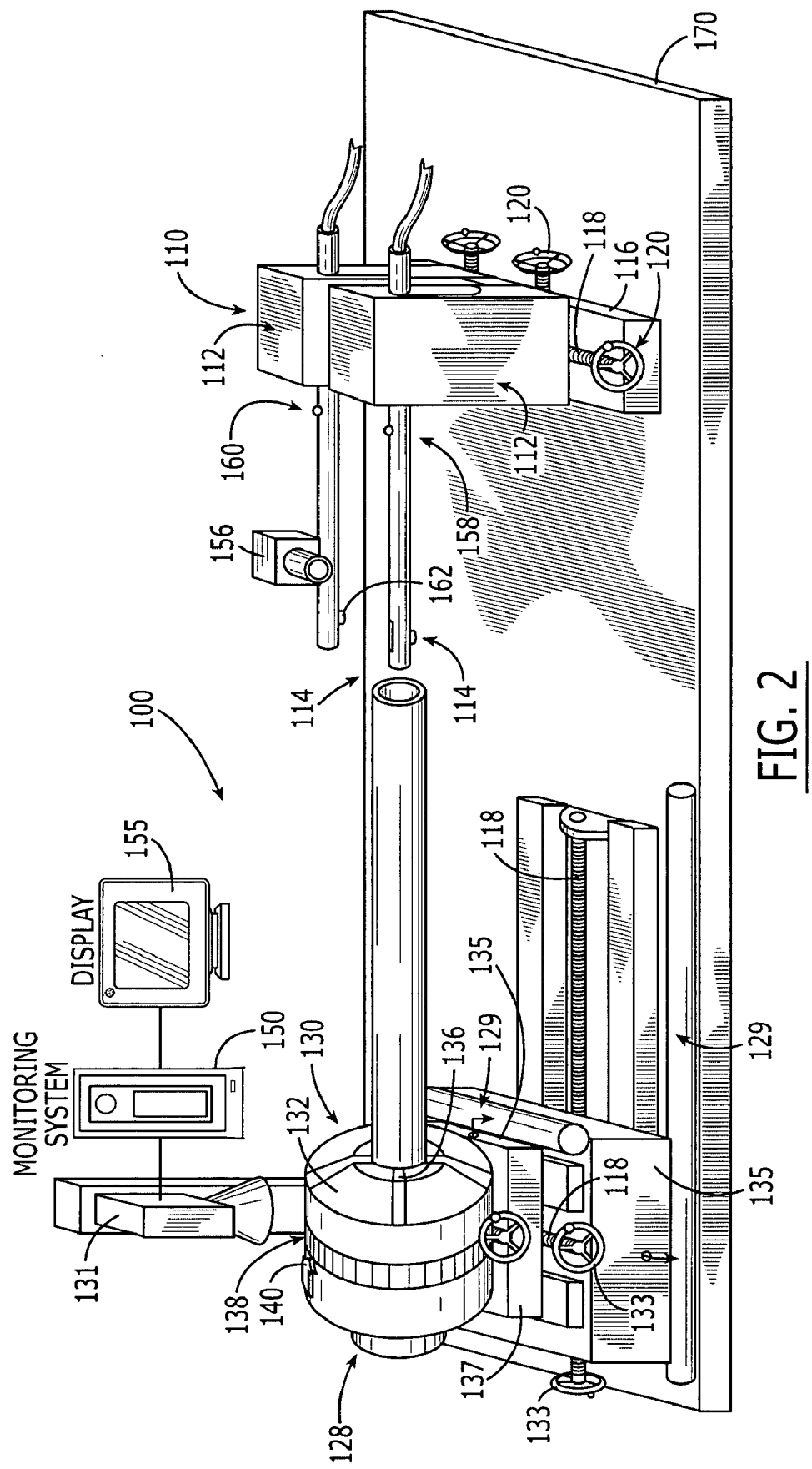
FIG. 2 is a perspective view of a borescopic device in accordance with another embodiment of the present invention.

Another embodiment of the borescopic device 100 is shown in FIG. 2. The borescopic device 100 of FIG. 2 includes the same components as the embodiment depicted in FIG. 1 and these common components therefore will not be further described. However, the borescopic device 100 of FIG. 2 includes not a single probe, but first and second probes 114 configured to capture images of the opposite surfaces of an object, such the interior and exterior surfaces of a cylindrical object, for example. While the first and second probes may be identical, such as by both being borescopic probes, the second probe (such as the probe adapted to monitor the exterior surface of the object) may carry a camera 156, such as a video camera, as shown in FIG. 2. As described above in conjunction with the probe of FIG. 1, the first and second probes 114 may be held by respective towers 112 and are each moveable in a first direction, such as the y-direction, such as by means of respective position adjusters. In addition, the first and second probes 114 may be moveable in a second direction, such as the z-direction, by means of respective position adjusters. Further, the borescopic imaging system 100 of the embodiment of FIG. 2 may include position indicators for separately providing indications of the respective positions of the first and second probes 114.

The borescopic imaging system 110 of this embodiment is capable of maintaining the first and second probes 114 in alignment with one another. In one embodiment, for example, one of the probes carries a laser diode or other optical source 158 and the other probe carries an optical detector 160, such as a phototransistor. The optical source 158 may therefore be driven, such as by an external controller to emit signals. By positioning the probes such that the optical detector 160 receives the signals emitted by the optical source 158, the first and second probes 114 are maintained in alignment. In this regard, the optical detector 160 is also advantageously in communication with the external controller for providing signals indicative of the received signals such that the probes 114 may be repositioned until they are in alignment as indicated by the receipt by the optical detector of the signals emitted by the optical source 158. In order to permit the optical source and the optical detector to remain in optical communication during the entire inspection process, the optical source and the optical detector are advantageously carried by the probes in a position spaced apart from the ends of the probes by a sufficient distance that the object never extends beyond the optical source and the optical detector and therefore never interferes with or prevents optical communications therebetween during the inspection process.

Figure 3:
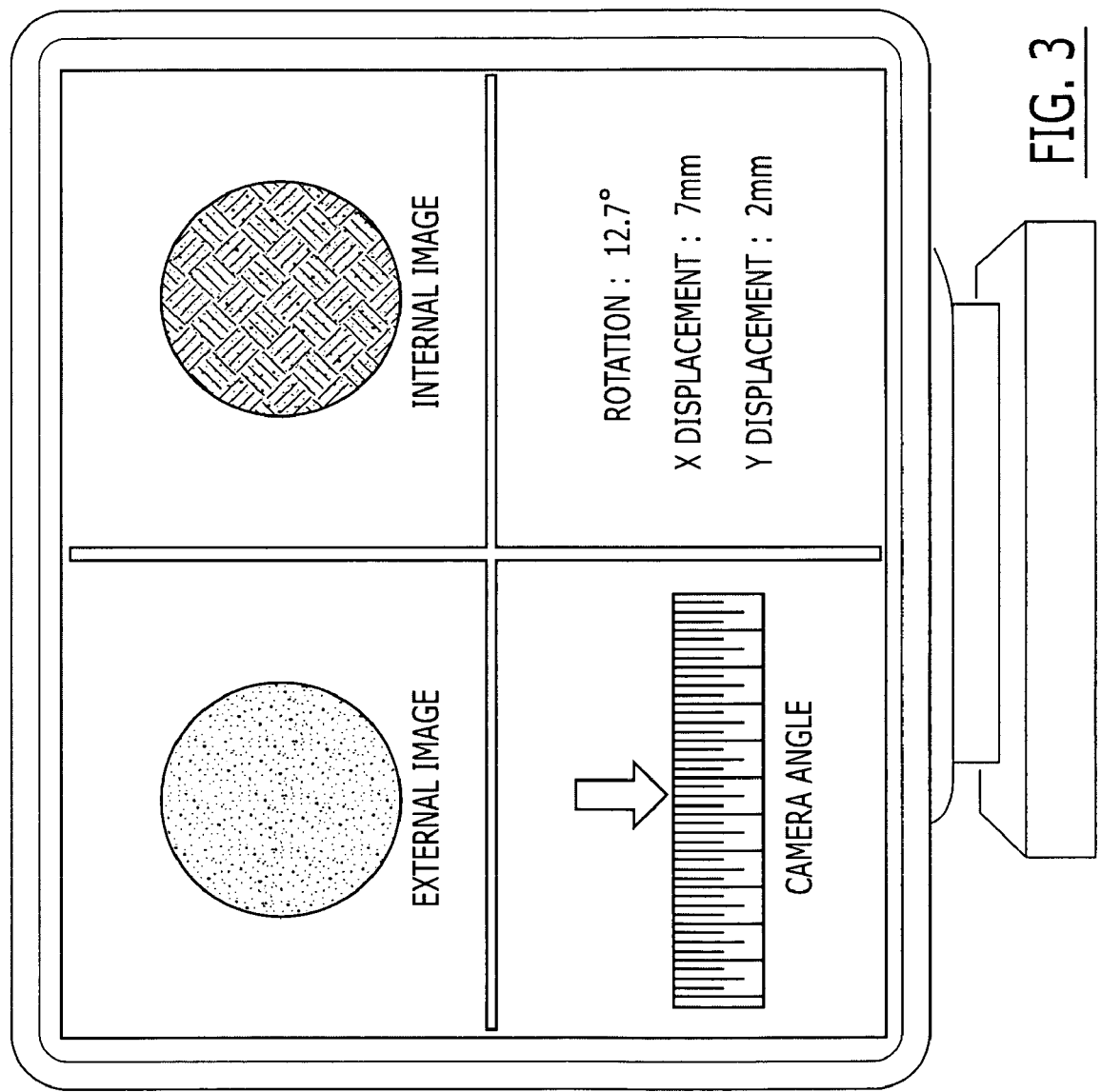
FIG. 3 is an exemplary display presented a borescopic device of one embodiment of the present invention.

The probes 114 of this embodiment may each also include pointer sources 162 that are positioned at the same location on each probe relative to the image captured by the respective probe. The pointer sources 162 emit a visible output that creates a reference point in the resulting image. For example, the pointer sources may be laser pointers that emit a visible laser output. As such, the images of the interior and exterior of the object may be aligned relative to the reference points that appear in each image. As in the embodiment of FIG. 1, the borescopic device 100 may include a monitoring system 150 and an associated display 155. The display 155 is designed to display the images captured by the first and second probes 114 and, in one embodiment presents a split screen as shown in FIG. 3 in which, for example, the images of the internal and external surfaces of the object are depicted concurrent with various indications of the position of the probe relative to the object when the images were captured.

The operation of borescopic device 100, in accordance with the presently disclosed embodiment, will now be described. As can be seen in FIG. 1, an object to be examined is mounted to holder assembly 130, such as by mounting an end of the object to upper holder 132 and securing the object such that it can be moved angularly in combination with upper holder 132. In the present embodiment, the object is secured to by the clamping device 136 of the upper holder 132. In accordance with such a configuration, the clamping device 136 can be adjusted to accommodate objects within a predetermined range of sizes by movement of adjustable jaws of clamping device 136. Thus, in the present embodiment, wherein upper holder 132 includes clamping device 136, differently-sized objects can be examined by borescopic device 100. In one embodiment, the object is mounted and the position indicators are set such that the initial position of the probe in a predetermined position relative to the object under test, such as by being centered at one end of a cylindrical object, is represented as the home or zero position by all of the various position indicators. The orientation of the object is also advantageously denoted, such as by making a mark at one end of the object at a predefined angular position. Thus, the object may be repositioned within the borescopic device in the same orientation at some later time in order to again analyze the object, such as to determine the extent of additional wear of the object.

After mounting the object to the upper holder 132, the holder assembly 130 is positioned such that the probe 114 of borescopic imaging system 110 is advanced alongside the object, such as by being inserted into the object. The probe 114 then captures an image of the surface of the object. The image is then provided to the monitoring system 150 for display and/or storage along with the respective indications of the position of the object and/or probe that are provided by the position indicators such that the monitoring system can determine the location of the object that is imaged. In one embodiment, the borescopic imaging system 110 may be held stationary, and the holder base 134 of the adjustable holder assembly 130 is moved through a desired linear range in at least the x- and y-directions, and the upper holder 132 is rotated through a desired angular range, with the probe(s) 114 capturing images at each discrete position until all desired portions of the object have been imaged. Movement of the object as opposed to the probes is especially advantageous in the dual probe embodiment depicted in FIG. 2 since the movement is simplified since only one item (the object) need be moved as opposed to two items (the two probes) and further since maintainence of the alignment between the probes is greatly simplied in instances in which the object is rotated instead of instances in which both probes would need to be rotated in some sort of coordinated fashion. Linear and angular movement of the object can be done sequentially or simultaneously. Moreover, instead of holding borescopic imaging system 110 stationary while holder assembly 130 moves, holder assembly 130 can be held stationary while borescopic imaging system 110 is moved. Alternatively, both holder assembly 130 and borescopic imaging system 110 can be moved simultaneously.

The movement of the adjustable holder assembly 130 and/or the borescopic imaging system 110 can be controlled by manual means as previously described, or alternatively, by a controller which can receive commands that control the movement of either of the adjustable holder assembly 130 or the borescopic imaging system 110. For example, in one embodiment, such a controller could be programmed to execute predetermined operations for certain types of objects, and when an object of a particular type is selected, the controller can instruct borescopic imaging system 110 and adjustable holder assembly 130 to perform certain movement and imaging functions to capture images according to a predetermined image capture process. In another embodiment, the controller can be used for precision imaging of the work-piece by allowing a user to set a desired position, then executing movement to orient the object to capture an image in the desired position.

As described, the borescopic device 100 and method of embodiments of the present invention provide for the controlled movement of the object under test both angularly and along several different axes, such that the object including its internal surfaces, can be thoroughly inspected in a controlled fashion. In addition, the borescopic device 100 and method of embodiments of the present invention permit those portions of an object that are depicted in an image to be precisely located, thereby facilitating comparisons with inspections of the same object conducted at other times and/or providing more detailed information during a forensic analysis of the object. Further, the borescopic device 100 and method of embodiments of the present invention permit the concurrent examination of opposed surfaces of the object, such as interior and exterior surfaces, by means of first and second probes that are maintained in alignment with one another, as shown in FIG. 2.

It is understood that upon reading the above description of the present invention and reviewing the accompanying drawings, one skilled in the art could make changes and variations therefrom. In particular, processes described can be controlled and performed by computer programs, and products described have several substitutes that are available and known to those skilled in the art. These changes and variations are included in the spirit and scope of the following appended claims.

That which is claimed is:

1. A borescopic device comprising:
    an adjustable holder assembly for holding an object, the adjustable holder assembly having a first positional adjuster for providing linear movement of the object in a first direction, a second positional adjuster for providing linear movement of the object in a second direction different from the first direction, an angular adjuster for providing angular movement of the object, and a position indicator for providing an indication of the position of the object in each of the first and second directions as well as the angular position of the object;

a borescopic imaging system having a probe moveable in the first direction and capable of capturing an image of at least one surface of the object, the boroscopic imaging system also having a position indicator for providing an indication of the position of the probe; and a monitoring system for determining the position of an image captured by the borescopic imaging system relative to the object based upon the indications provided by the position indicators of the adjustable holder assembly and the borescopic imaging system.

2. A borescopic device in accordance with claim 1 wherein the position indicator of the adjustable holder assembly comprises a camera for capturing a visible representation of the position of the object.

3. A borescopic device in accordance with claim 1 wherein the position indicator of the borescopic imaging system comprises a camera for capturing a visible representation of the position of the probe.

4. A borescopic device in accordance with claim 1 wherein the position indicator of the adjustable holder assembly comprises a transducer for providing a signal representative of the position of the object.

5. A borescopic device in accordance with claim 1 wherein the position indicator of the borescopic imaging system comprises a transducer for providing a signal representative of the position of the probe.

6. A borescopic device in accordance with claim 1 further comprising a display for displaying the image captured by the borescopic imaging system.

7. A borescopic device in accordance with claim 6 wherein the display is further capable of displaying the indication of the position of at least one of the probe and the object concurrent with the display of the image.

8. A borescopic device in accordance with claim 1 wherein at least one of the adjustable holder assembly and the borescopic imaging system further includes an additional positional adjuster for providing linear movement of at least one of the object and the probe in a third direction, different than the first and second directions.

9. A borescopic device in accordance with claim 8 wherein the first direction, the second direction, and the third direction are perpendicular to each other.

10. A borescopic device in accordance with claim 1, further comprising a supporting platform for supporting both the adjustable holder assembly and the borescopic imaging system.

11. A borescopic device in accordance with claim 1 wherein the borescopoic imaging system further includes first and second probes capable of capturing images of opposing surfaces of the object.

12. A borescopic device in accordance with claim 1 wherein the monitoring system is capable of supplementing a CAD drawing with information gathered during an examination of the object.

13. A method for examination of an object comprising:
securing the object within a holder;
positioning the holder and the object secured therein both angularly and in first and second different linear directions and providing an indication of the resulting position of the object;

positioning a probe relative to the object in the first direction and providing an indication of the resulting position of the probe;
capturing an image of a surface of the object with the probe; and
determining the position of the image captured with the probe relative to the object based upon the indication of the position of the object both angularly and in first and second directions and the indication of the position of the probe.

14. A method according to claim 13 wherein providing an indication of the resulting position of the probe comprises providing a visible representation of the position of the probe.

15. A method according to claim 13 wherein providing an indication of the resulting position of the object comprises providing a visible representation of the position of the object.

16. A method according to claim 13 wherein providing an indication of the resulting position of the probe comprises providing a signal representative of the position of the probe.

17. A method according to claim 13 wherein providing an indication of the resulting position of the object comprises providing a signal representative of the position of the object.

18. A method according to claim 13 further comprising displaying an image of the surface of the object.

19. A method according to claim 13 further comprising concurrently displaying the indication of the position of at least one of the probe and the object.

20. A method according to claim 13 wherein positioning at least one of the object and the probe comprises positioning at least one of the object and the probe in a third linear direction, different than the first and second linear directions.

21. A method according to claim 13 further comprising supplementing a CAD drawing with information gathered during the examination of the object.

22. A borescopic device comprising:
an adjustable holder assembly for holding an object, the adjustable holder assembly having a first positional adjuster for providing linear movement of the object in a first direction, a second positional adjuster for providing linear movement of the object in a second direction different from the first direction, and an angular adjuster for providing angular movement of the object; and
a borescopic imaging system having first and second probes moveable in the first direction and capable of capturing respective images of opposite surfaces of the object, said borescopic imaging system capable of maintaining the first and second probes in alignment with one another.

23. A borescopic device in accordance with claim 22 wherein one of the probes carries an optical source and the other of the probes carries an optical detector for facilitating alignment of the first and second probes.

24. A borescopic device in accordance with claim 22 wherein the first and second probes each include a pointer source for creating a respective reference points in the images of the opposite surfaces of the object.

25. A borescopic device in accordance with claim 22 further comprising a display for presenting the images of the opposite surfaces of the object.

26. A borescopic device in accordance with claim 25 wherein the adjustable holder assembly includes a position indicator for providing an indication of the position of the object in each of the first and second directions as well as the angular position of the object, wherein the borescopic imaging system includes a position indicator for providing an indication of the position of the probe, and wherein the display is further capable of displaying the indication of the position of at least one of the probe and the object concurrent with the display of the images of the opposite surfaces of the object.

27. A borescopic device in accordance with claim 22 wherein at least one of the adjustable holder assembly and the borescopic imaging system further includes an additional positional adjuster for providing linear movement of at least one of the object and the probe in a third direction, different than the first and second directions.

* * * * *